United States Patent [19]
Hellsten et al.

[11] Patent Number: 5,979,479
[45] Date of Patent: Nov. 9, 1999

[54] USE OF ALKOXYLATED ALKANOLAMIDE TOGETHER WITH ALKOXYLATED ALCOHOL AS A FRICTION-REDUCING AGENT

[75] Inventors: Martin Hellsten, Ödsmål; Ian Harwigsson, Malmö, both of Sweden

[73] Assignee: Akzo Nobel NV, Arnhem, Netherlands

[21] Appl. No.: 08/875,186

[22] PCT Filed: Jan. 9, 1996

[86] PCT No.: PCT/EP96/00155

§ 371 Date: Sep. 3, 1997

§ 102(e) Date: Sep. 3, 1997

[87] PCT Pub. No.: WO96/22341

PCT Pub. Date: Jul. 25, 1996

[30] Foreign Application Priority Data

Jan. 19, 1995 [SE] Sweden ................................. 9500159

[51] Int. Cl.$^6$ ........................................................ F17D 1/17
[52] U.S. Cl. .............................. 137/13; 210/698; 422/16; 507/90; 508/555
[58] Field of Search .............................. 137/13; 210/698, 210/749; 252/547, 548; 507/90, 261; 508/555; 422/16

[56] References Cited

U.S. PATENT DOCUMENTS 3,961,639   6/1976   Chang et al. .............................. 137/13
4,427,562   1/1984   Horodysky et al. ..................... 252/51.5
5,339,855   8/1994   Hellsten et al. ........................... 137/13
5,454,984   10/1995  Graubart et al. ......................... 252/547

FOREIGN PATENT DOCUMENTS 2 093 478   9/1982   United Kingdom .
WO 92/13925 8/1992   WIPO .

OTHER PUBLICATIONS

PCT International Search Report, Jun. 7, 1996.

Derwent Abstract 91–007873, Aug. 1990.

Derwent Abstract 91–007872, Aug. 1990.

*Primary Examiner*—Peter A. Hruskoci
*Attorney, Agent, or Firm*—Ralph J. Mancini; Joan M. McGillycuddy

[57] ABSTRACT

Use of a mixture of at least one alkanolamide of general formula (I), wherein R is a hydrocarbon group having 7–23 carbon atoms, preferably 11–23 carbons atoms, A is an alkyleneoxy group having 2–4 carbon atoms and n is 2–12, preferably 2–8, and at least one alkoxylated alcohol in a weight ratio between the alkoxylated alkanolamide and the alkoxylated alcohol from 10:1 to 1:10, preferably in the range from 5:1 to 1:5 for producing a water-base liquid system with reduced flow resistance between the flowing, water-base liquid system and a solid surface.

12 Claims, No Drawings

USE OF ALKOXYLATED ALKANOLAMIDE TOGETHER WITH ALKOXYLATED ALCOHOL AS A FRICTION-REDUCING AGENT

This application is a 371 of PCT/EP96/00155, filed Jan. 9, 1996.

The present invention relates to the use of an alkoxylated alkanolamide together with an alkoxylated alcohol in a water-base system for reducing the flow resistance between a solid surface and the water-base liquid system.

Surfactants with the ability to form extremely long, cylindrical micelles have, in recent years, attracted a great interest as friction-reducing additives to systems with circulating water, especially those destined for heat or cold distribution.

An important reason for this interest is that, although one desires to maintain a laminar flow in the conduits, one wishes at the same time to have turbulence in the heat exchangers to achieve therein a high heat transfer per unit area.

As may easily be understood, fibres or chain polymers are unable to provide this double function which, however, can be achieved with rod-shaped micelles, since the flow rate (the Reynold's number) usually is much higher in the heat exchangers than in the conduit.

The rod-shaped micelles are distinguished by operating in a fairly disorderly fashion at low Reynold's numbers (below $10^4$), having no or only a very slight effect on the flow resistance.

At higher Reynold's numbers (above $10^4$), the micelles are paralleled and result in a friction reduction very close to that which is theoretically possible.

At even higher Reynold's numbers (e.g. above ($10^5$), the shear forces in the liquid become so high that the micelles start to get torn and the friction-reducing effect rapidly decreases as the Reynold's number increases above this value.

The range of Reynold's numbers within which the surface-active agents have a maximum friction-reducing effect is heavily dependent on the concentration, the range increasing with the concentration.

By choosing the right concentration of surface-active agents and suitable flow rates in tubings and heat exchangers, it is thus possible to establish a laminar flow in the tubes and turbulence in the heat exchangers. Thus, the dimensions of both the tubes and the exchangers can be kept at a low level, or the number of pump stations, and consequently the pump work, can alternatively be reduced while retaining the same tubular dimensions.

The surface active agents most commonly used as friction-reducing additives to circulating water systems for heat or cold distribution are of the type represented by alkyltrimethyl ammonium salicylate wherein the alkyl group is a long alkyl chain which has 12–22 carbon atoms and which may either be saturated or contain one or more double bonds.

This type of surface-active agent functions satisfactorily already at a concentration of 0.5–2 kg/m$^3$, but is degraded very slowly, both aerobically and anaerobically, and further is highly toxic to marine organisms.

Since heat-distribution systems for small houses usually suffer from important leaks (it is estimated that in one year 60–100 per cent of the water leaks out), it follows that the added chemicals end up in the ground water and in various fresh-water recipients. This combination of low biodegradability and high toxicity is a fundamental criterion for a product injurious to the environment.

Thus there is a general demand for surface-active agents which are less harmful to the environment but which have the same excellent ability as the quaternary ammonium compounds described above to reduce the flow resistance in circulating water systems.

In the U.S. Pat. No. 5,339,855 it is described that alkoxylated alkanolamides with the general formula

(I)

wherein R is a hydrocarbon group having 9–23 carbon atoms, A is an alkyleneoxy group having 2–4 carbon atoms and n is 3–12, are capable of forming long cylindrical micelles in water and thus reduce the friction in water-based system.

These products are easily degradable and function excellently in deionized water especially at low temperatures. However, the friction-reducing effects are hampered in hard water and by the presence of high amounts of electrolytes. Further the temperature range for their optimal friction-reducing effect will be rather narrow, sometimes as small as 10° C.

In the U.S. Pat. No. 3,961,639 it is disclosed that a solution of ethoxylated fatty alcohols may have good friction-reducing properties when it is tested at a temperature close to the cloud point of the solution and when the surfactant concentration is at least 5 and preferably 10 kg/m$^3$.

We have now surprisingly found that a combination of alkoxylated fatty acid alkanolamides of formula I and an alkoxylated alcohol of the formula II $$R_1-(C_rH_{2r}O)_mH \qquad (II)$$

where $R_1$ is a saturated or unsaturated hydrocarbon group containing 8–24 carbon atoms, m is a number from 1 to 12 and r a number from 2 to 4 with the proviso that at least half of the alkyleneoxy units consists of $C_2H_4O$ units, will give water solutions with improved friction-reducing properties at low temperatures within a rather wide temperature range both below and above the cloud point of the solution in comparison with the compounds forming the composition. Preferably the combination of the alkoxylated alkanolamide and the alkoxylated alcohol has a cloud point between the highest and the lowest temperature for which the water-base system is intended. Furthermore, the crystallization temperature for the combination is suitably below the lowest temperature for which the water-base system is intended.

The mixtures according to the invention can also tolerate hard water and electrolytes which may be added e.g. as corrosion inhibitors.

The weight ratio between the alkoxylated alkanolamide and the alkoxylated alcohol may be varied between 10:1 and 1:10, normally between 5:1 and 1:5. Besides the structure of the two surfactant components the weight ratio will also depend significantly on the hardness and salt content of the water and the desired temperature working range for the solution.

The total amount of the alkoxylated alkanolamide and the alkoxylated alcohol may vary within wide limits depending on the conditions, but is generally 0.1–10 kg/m$^3$ of the water-base system.

By "water-base" is meant that at least 50 per cent by weight, preferably at least 90 per cent by weight, of the water-base liquid system consists of water.

The combination of alkoxylated alkanolamide and alkoxylated alcohol is especially suited for use in water-base systems flowing in long conduits, e.g. circulating water systems for heat or cold distribution.

The alkoxylated alcohols according to the invention preferably contain from 12 to 22 carbon atoms in the hydrocarbon group, while m preferably is from 3 to 8 and r is 2.

The preferred alkoxylated alkanolamides for this invention contain 13–23 carbon atoms in the hydrocarbon group, the alkyleneoxy group has 2 carbon atoms and n is a number from 3 to 6. For cooling water applications when the water temperature is below 30° C. it is preferable that at least a part of the hydrocarbon groups R and $R_1$ contain one and/or more double bonds.

The alkoxylated alkanolamide can be produced by amidation of a carboxylic acid of the formula RCOOH, wherein R has the meaning stated above, with an alkanolamine of the formula $NH_2AH$, wherein A has the meaning stated above, or by aminolysis of a corresponding triglyceride or methyl ester with the abovementioned alkanolamine followed by alkoxylation of the resulting amide. The alkoxylation may be carried out in the presence of an alkaline catalyst at a temperature of 40–180° C.

It is especially suitable to carry out the alkoxylation in the presence of a tertiary amine lacking protons that react with alkylene oxide, or an alkylene-oxide-quaternised derivative of the tertiary amine at a temperature ranging from room temperature to 120° C., which results in high yields of the desired product. Suitable teritary amines include trimethylamine, triethylamine, tributylamine, dimethyloctylamine, tetramethylethylenediamine, dimethyl coconut amine, tristearyl amine, dimethyl piperazine and diazabicyclooctane.

The alkoxylation may comprise ethoxylation, propoxylation, addition of propylene oxide in blocks, simultaneous addition of ethylene oxide and propylene oxide, or a combination thereof. The ethylene oxide conveniently amounts to at least 50 mole per cent of the added alkylene oxide. To use only ethoxylation is preferred.

The carboxylic acids of the formula RCOOH, wherein R has the meaning stated above, may be aliphatic, aromatic as well as cyclo-aliphatic. Suitable carboxylic acids include the aliphatic carboxylic acids in which the hydrocarbon part may be saturated or unsaturated, straight or branched. To use conventional fatty acids is especially preferred.

Suitable alkoxylated alkanolamides include the following specific examples:

wherein

is derived from rape seed oil fatty acid,

wherein

is derived from rape seed oil fatty acid,

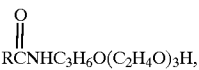

wherein

is derived from lauric acid,

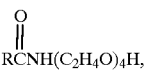

wherein

is derived from lauric acid,

wherein

is derived from stearic acid, and the group A is random added from equal mole parts of ethylene oxide and propylene oxide

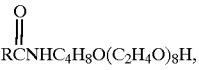

wherein

is derived from linolenic acid.

The choice of chain length and degree of unsaturation is determined by the temperature range in which the alkoxylated alkanolamide is to operate but also by the kind and amount of the alkoxylated alcohol which will be included in the mixture and the hardness and salt content of the water which shall be used for the solution.

The general principle is then that a hydrophobic alkoxylated alkanolamide, i.e. with a large hydrocarbon group and a low degree of alkoxylation will need a rather hydrophilic alkolylated alcohol i.e. with a short to moderate hydrocarbon group and a moderate to large alkyleneoxy group which mainly should consist of ethyleneoxy units. The alkoxylated alcohol may also contain two or more alkyleneoxy groups.

The use of hard or salt water will have the same effect as making the alkoxylated alkanolamide more hydrophobic, i.e. it creates a demand for either a higher amount of the alkoxylated alcohol or a more hydrophilic surfactant of this type. A convenient way to find out the right proportion between the alkoxylated alcohol and the alkoxylated alkanolamide is to disperse the latter in the water having the highest temperature in the planned operational temperature range and then add successively a solution of the former surfactant until the dispersed alkoxylated alkanolamide just has been solubilized.

Suitable alkoxylated alcohols according to the invention are ethoxylated fatty alcohols where the alcohols have been produced from fatty acids or fatty acid esters or by hydroformulation of olefins by a so-called Oxo-process. The hydrocarbon group in the alcohol may be branched or unbranched, saturated or unsaturated and the choice will be determined by the temperature working range for which the final product is intended where branched or unsaturated groups are preferred for low-temperature work i.e. for cooling water.

Apart from the alkoxylated alkanolamide and the alkoxylated alcohol the water-base system may contain a number of conventional components, such as rust-preventing agents, anti-freeze, and bactericides. The system may also include solubilisers, such as diethylene glycol monobutyl ethers, which may affect the cloud-point of the surfactant mixture in the water-base system quite considerably.

The present invention will now be further illustrated with the aid of the following examples.

EXAMPLES

The friction-reducing properties of the compositions and products according to the prior art have been tested according to two different methods, one rather simple procedure, which will be called the screening test, and one more elaborated streaming test, which will be called the loop test.

Screening test

A series of 50 ml glass beakers of the same dimensions (65×35 mm) each containing a Teflon-covered cylindrical magnet (20×6 mm) were each filled with 40 ml test solution and then kept in a refrigerator at least 4 h at 3° C. The beakers were then taken out one by one, immediately placed on a magnetic stirrer, a thermometer immersed to a depth of 15 mm, the stirrer started at full speed, 1400 rpm, and the depth of the vortex formed in the solution was recorded at various temperatures while the solution temperature increased to room temperature during 15 mins.

When no vortex could be detected (recorded as 0 mm), it is known by experience that this indicates good friction reducing properties.

If on the other hand no efficient additive was present, e.g. for pure water the vortex reached down to the stirring magnet and the result was recorded as 35 mm.

Loop test

Measurements were carried out in a 6 m tube loop consisting of two straight and stainless tubes (3 m each), one tube having an inner diameter of 8 mm and the other having an inner diameter of 10 mm. Water was pumped through the tube loop by a centrifugal pump, which was driven by a frequency-controlled motor for continuous adjustment of the flow rate, which was determined by a rotameter.

The straight parts of the tube loop had outlets which, with the aid of valves, could in turn be connected to a differential pressure gauge whose other side was all the time connected to a reference point in the tube loop. Further, the tube loop was heat-insulated, and the suction side of the pump was connected to a thermostatically controlled container with a volume of 20 l, to which the return flow from the tube loop was directed.

After the test compound had been added and the aqueous solution had been thermostatically controlled, measurements began at low flow rates, and the pressure difference from two points on the 10 mm tube and three points on the 8 mm tube were measured for each flow rate. The pressure differences thus measured were then converted into Moody's friction factory Y and are shown in the examples as a function of the Reynold's number Re.

$Y = 2D \cdot P_{diff} / V^2 \cdot L \cdot d$ $Re = D \cdot V \cdot d / u$

D = tube diameter

V = flow rate

L = tube length over which the pressure difference $P_{diff}$ was measured d = density of the liquid u = viscosity of the liquid The examples also state the corresponding Prandtl number and Virk number. The former corresponds to the friction factor of water only, i.e. with turbulence, and the latter corresponds to flow without turbulence, i.e. a laminar flow.

Examples 1–3

These examples were carried out according to the screening test described previously.

The alkoxylated alkanolamides used in these examples were monoethanolamides of technical oleic acid to which had been added 3; 4; 5; and 6 moles of ethylene oxide. These products will in the following be called OMA-3; OMA-4 etc. The technical oleic acid consists of 60 percent oleic acid, 20 percent linoleic acid and 10 percent linolenic acid, the rest being mainly palmitic and stearic acids.

As alkoxylated alcohol in these examples has been used the reaction product of 1 mol technical oleyl alcohol with an iodine number of 85 and 6 moles of ethylene oxide with KOH as a catalyst. This product is hereafter called OLA-6.

The water used in these examples was a hard water containing 2.2 moles $Ca^{2+}$ and 1.4 moles $Mg^{2+}$ per $m^3$ and as a corrosion inhibitor 1.3 kg $NaNO_2$, 0.35 kg $NaNO_3$ and 0.35 kg $NaBO_2 \cdot 4 H_2O$ per $m^3$.

The composition of the test solutions are given in the table below:

| Test solution | OMA-3 | OMA-4 | OMA-5 | OMA-6 | OLA-6 |
|---|---|---|---|---|---|
| | All conc. given in kg a.s.*) per $m^3$ | | | | |
| I | 0.80 | — | — | — | 3.50 |
| II | — | 2.00 | — | — | 2.00 |
| III | — | — | 2.00 | — | 2.00 |
| Comparison 1 | — | — | — | — | 4.00 |
| Comparison 2 | — | 1.60 | — | 2.40 | — |

*)a.s. = active substance

The test results are given as the depth of the vortex formed in mm at the stirrer speed of 1400 rpm.

| Test solution | Temperature, °C. | | | | | | |
|---|---|---|---|---|---|---|---|
| | 3 | 5 | 8 | 12 | 14 | 18 | 20 |
| I | 2* | 2* | 3* | 3* | 4* | 4* | 4* |
| II | 0 | 0 | 2 | 3* | 5* | 10* | 10* |
| III | 0 | 0 | 0 | 1 | 2* | 4* | 5* |
| Comparison I | 20 | 20 | 20 | 13 | 2 | 2 | 2 |
| Comparison II | 15 | 5 | 0 | 1 | 3 | 10 | 10 |

The asterisk * means that the solution was turbid.

The results of these tests indicate that the compositions according to the invention have a significant stabilizing effect on the water in immediate vicinity of a turbulent zone and have thus a good friction-reducing ability on water flowing in a tube, especially at low temperatures. The comparison tests show that the ethoxylated alcohol has only a limited friction-reducing effect at temperatures below 14° C., while the ethoxylated ethanolamides in Comparison II show an excellent friction-reducing effect only within a narrow temperature interval (8–14° C.).

Examples 4–6

These examples were carried out according to the loop test. The water used had the same composition as the water in Examples 1–3. The surfactants added were 3.00 kg/m³ of OMA-5 and 3.00 kg/m³ of OLA-6 where the acronyms OMA-5 and OLA-6 has the same meaning as in Examples 1–3.

Example 4

Water temp. 6.4° C., pH 9.5, cloud point 12° C.

| | Moody's friction factor × 10³ | | | | | | |
|---|---|---|---|---|---|---|---|
| Reynolds number | $3 \times 10^3$ | $5 \times 10^3$ | $10^4$ | $2 \times 10^4$ | $3 \times 10^4$ | $4 \times 10^4$ | $6 \times 10^4$ |
| Prandtl number | 45 | 38 | 32 | 27 | 24 | 22 | 20 |
| 10 mm tube | 50 | 30 | 19 | 18 | 14 | 16 | 20 |
| 8 mm tube | 47 | 23 | 10 | 11 | 12 | 15 | 18 |
| Virk number | 25 | 18 | 11 | 7 | 6 | 5 | 4.5 |

Example 5

Water temp. 11° C., pH 9.5, cloud point 12° C.

| | Moody's friction factor × 10³ | | | | | | |
|---|---|---|---|---|---|---|---|
| Reynolds number | $3 \times 10^3$ | $5 \times 10^3$ | $10^4$ | $2 \times 10^4$ | $3 \times 10^4$ | $4 \times 10^4$ | $6 \times 10^4$ |
| Prandtl number | 45 | 38 | 32 | 27 | 24 | 22 | 20 |
| 10 mm tube | 43 | 32 | 17 | 11 | 7 | 7 | 12 |
| 8 mm tube | 42 | 25 | 12 | 10 | 7 | 5 | 11 |
| Virk number | 25 | 18 | 11 | 7 | 6 | 5 | 4.5 |

Example 6

Water temp. 20.5° C., pH 9.5, cloud point 12° C.

| | Moody's friction factor × 10³ | | | | | | |
|---|---|---|---|---|---|---|---|
| Reynolds number | $3 \times 10^3$ | $5 \times 10^3$ | $10^4$ | $2 \times 10^4$ | $3 \times 10^4$ | $4 \times 10^4$ | $6 \times 10^4$ |
| Prandtl number | 45 | 38 | 32 | 27 | 24 | 22 | 20 |
| 10 mm tube | 55 | 30 | 13 | 10 | 8 | 6 | 5 |
| 8 mm tube | 35 | 23 | 11 | 8 | 6 | 5 | 5 |
| Virk number | 25 | 18 | 11 | 7 | 6 | 5 | 4.5 |

From these three loop tests with a composition according to the invention it can clearly be seen that a substantial friction-reducing effect can be achieved in the temperature range 6–21° C. in a hard water containing added salts and with a dosage of 6.0 kg per m³.

We claim:

1. A method for reducing the flow resistance between a flowing, water-based liquid system and a solid surface which comprises adding to said liquid system at least one alkoxylated alkanolamide of the general formula $$\underset{\underset{O}{\parallel}}{R\overset{}{C}}NH(A)_nH \qquad (I)$$

wherein R is a hydrocarbon group having 7–23 carbon atoms, A is an alkyleneoxy group having 2–4 carbon atoms and n is 2–12, and at least one alkoxylated alcohol of the formula $$R_1\text{---}(C_rH_{2r}O)_mH \qquad (II)$$

where $R_1$ is a saturated or unsaturated hydrocarbon group containing 8–24 carbon atoms, m is a number from 1 to 12 and r a number from 2 to 4 with the proviso that at least half of the alkyleneoxy units consist of $C_2H_4O$ units, in a weight ratio between the alkoxylated alkanolamide and the alkoxylated alcohol from 10:1 to 1:10.

2. The method of claim 1, wherein the combination of the alkoxylated alkanolamide and the alkoxylated alcohol has a cloud point between the highest and the lowest temperature for which the water-base system is intended.

3. The method of claim 1 wherein the crystallization temperature for the mixture is below the lowest temperature for which the water-based system is intended.

4. The method of claim 1 wherein the water-based system is a cooling medium with a temperature below 30° C.

5. The method of claim 1 wherein the mixture of alkoxylated alkanolamide and alkoxylated alcohol is added in an amount of 0.1–10 kg/m³ of the water-base system.

6. The method of claim 1 wherein at least half of the alkyleneoxy groups in the alkoxylated alkanolamide are ethyleneoxy groups.

7. The method of claim 6 wherein A is an ethyleheoxy group.

8. The method of claim 1 wherein at least half of the groups $C_rH_{2r}O$ in the alkoxylated alcohol are ethyleneoxy groups.

9. The method of claim 8 wherein all alkyleneoxy groups are ethyleneoxy groups.

10. The method of claim 1 wherein at least a part of the hydrocarbon groups R and $R_1$ contain one and/or more double bonds.

11. The method of claim 1 wherein the weight ratio between the alkoxylated alkanolamide and the alkoxylated alcohol is in the range of from 5:1 to 1:5.

12. The method of claim 1 wherein R is a hydrocarbon having 11–23 carbon atoms and n is 2–8.

* * * * *

UNITED STATES PATENT AND TRADEMARK OFFICE
CERTIFICATE OF CORRECTION

PATENT NO. : 5,979,479
DATED : November 9, 1999
INVENTOR(S) : HELLSTEN, M., et al.

It is certified that error appears in the above-indentified patent and that said Letters Patent is hereby corrected as shown below:

In claim 1, line 39 please add the word --is-- before "a number from 2 to 4 with the proviso that at least half"

In claim 7, line 58 please replace the word "ethyleheoxy" with --ethyleneoxy--

Signed and Sealed this

Twenty-sixth Day of December, 2000

Attest:

Q. TODD DICKINSON

Attesting Officer     Director of Patents and Trademarks